United States Patent
Cheng et al.

(10) Patent No.: US 9,778,443 B2
(45) Date of Patent: Oct. 3, 2017

(54) THREE-SURFACE WIDE FIELD-OF-VIEW LENS SYSTEM

(71) Applicant: OmniVision Technologies, Inc., Santa Clara, CA (US)

(72) Inventors: Tingyu Cheng, New Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/875,012

(22) Filed: Oct. 5, 2015

(65) Prior Publication Data

US 2017/0097497 A1    Apr. 6, 2017

(51) Int. Cl.
 G02B 9/00 (2006.01)
 G02B 13/00 (2006.01)
 G02B 1/04 (2006.01)
 G02B 9/04 (2006.01)

(52) U.S. Cl.
 CPC ......... G02B 13/0085 (2013.01); G02B 1/041 (2013.01); G02B 9/04 (2013.01); G02B 13/003 (2013.01); G02B 13/006 (2013.01)

(58) Field of Classification Search
 CPC ................................. G02B 13/0085
 USPC ........................................ 359/738
 See application file for complete search history.

(56) References Cited

U.S. PATENT DOCUMENTS

| | | | | |
|---|---|---|---|---|
| 8,610,823 B2* | 12/2013 | Rossi | ..................... | G02B 5/005 348/374 |
| 2014/0128673 A1* | 5/2014 | Cheng | ..................... | G02B 13/06 600/109 |
| 2014/0334016 A1* | 11/2014 | Yin | ..................... | G02B 13/0085 359/714 |

FOREIGN PATENT DOCUMENTS

CN    101512768 B    11/2012
WO    2008011003 A2    1/2008

OTHER PUBLICATIONS

Taiwan Patent Application No. 105128828, English translation of the first Office Action dated Apr. 18, 2017, 2 pages.

* cited by examiner

*Primary Examiner* — James Jones
(74) *Attorney, Agent, or Firm* — Lathrop Gage LLP (57) ABSTRACT

A three-surface wafer-level lens system for imaging a wide field-of-view scene onto an image plane includes (a) a first wafer-level lens with (i) a first substrate having a first planar surface facing the image plane, and (ii) a first lens element bonded to the first planar surface and having a first lens surface facing the image plane, and (b) a second wafer-level lens with (i) a second substrate having a second planar surface facing away from the image plane, (ii) a third substrate bonded to the second substrate and having a third planar surface facing the image plane, (iii) a second lens element bonded to the second planar surface and having a second lens surface facing away from the image plane, and (iv) a third lens element bonded to the third planar surface and having a third lens surface facing the image plane.

9 Claims, 10 Drawing Sheets

THREE-SURFACE WIDE FIELD-OF-VIEW LENS SYSTEM

BACKGROUND

Wide field-of-view (FOV) cameras are used in a variety of applications including surveillance and traffic monitoring. In surveillance, the wide FOV makes it possible to monitor a large area with a single camera. In traffic monitoring, a vehicle may be equipped with one or more cameras that image surroundings of the vehicle to, e.g., avoid collisions. Most conventional wide FOV lens systems include a large number of machined or cast lenses and a large number of associated lens surfaces, for example six lenses with eleven lens surfaces/interfaces. This allows for incorporating, into a single lens system, many different materials having diverse indices of refraction so as to properly propagate wide-angle rays through the lens system. Typically, the lens (or lenses) closest to the scene has a very large diameter in order to collect and guide these wide-angle rays.

SUMMARY

Disclosed herein are wide field-of-view (FOV) lens systems configured to image a wide FOV scene onto an image plane. These wide-FOV lens systems use a low number of lens surfaces, thus simplifying manufacture as compared to conventional wide-FOV lens systems, and are well-suited for incorporation into compact camera modules used, for example, in portable devices or other devices subject to tight spatial constraints.

In an embodiment, a three-surface lens system for imaging a wide field-of-view scene onto an image plane includes a first lens surface, a second lens surface, and a third lens surface. The second lens surface is disposed between the first lens surface and the third lens surface, and the third lens surface is disposed between the second lens surface and the image plane. The first lens surface faces the image plane, the second lens surface faces away from the image plane, and the third lens surface faces the image plane. The first lens surface, the second lens surface, and the third lens surface are the only non-planar surfaces experienced by light propagating from the wide field-of-view scene to the image plane.

In an embodiment, a three-surface wafer-level lens system for imaging a wide field-of-view scene onto an image plane includes a first wafer-level lens and a second wafer-level lens. The first wafer-level lens has a first substrate with a first planar surface facing the image plane, and a first lens element bonded to the first planar surface. The first lens surface faces the image plane. The second wafer-level lens includes a second substrate, a third substrate, a second lens element, and a third lens element. The second substrate has a second planar surface facing away from the image plane. The third substrate is bonded to the second substrate and has a third planar surface facing the image plane. The second lens element is bonded to the second planar surface and has a second lens surface facing away from the image plane. The third lens element is bonded to the third planar surface and has a third lens surface facing the image plane.

DETAILED DESCRIPTION OF THE EMBODIMENTS

Figure 1:
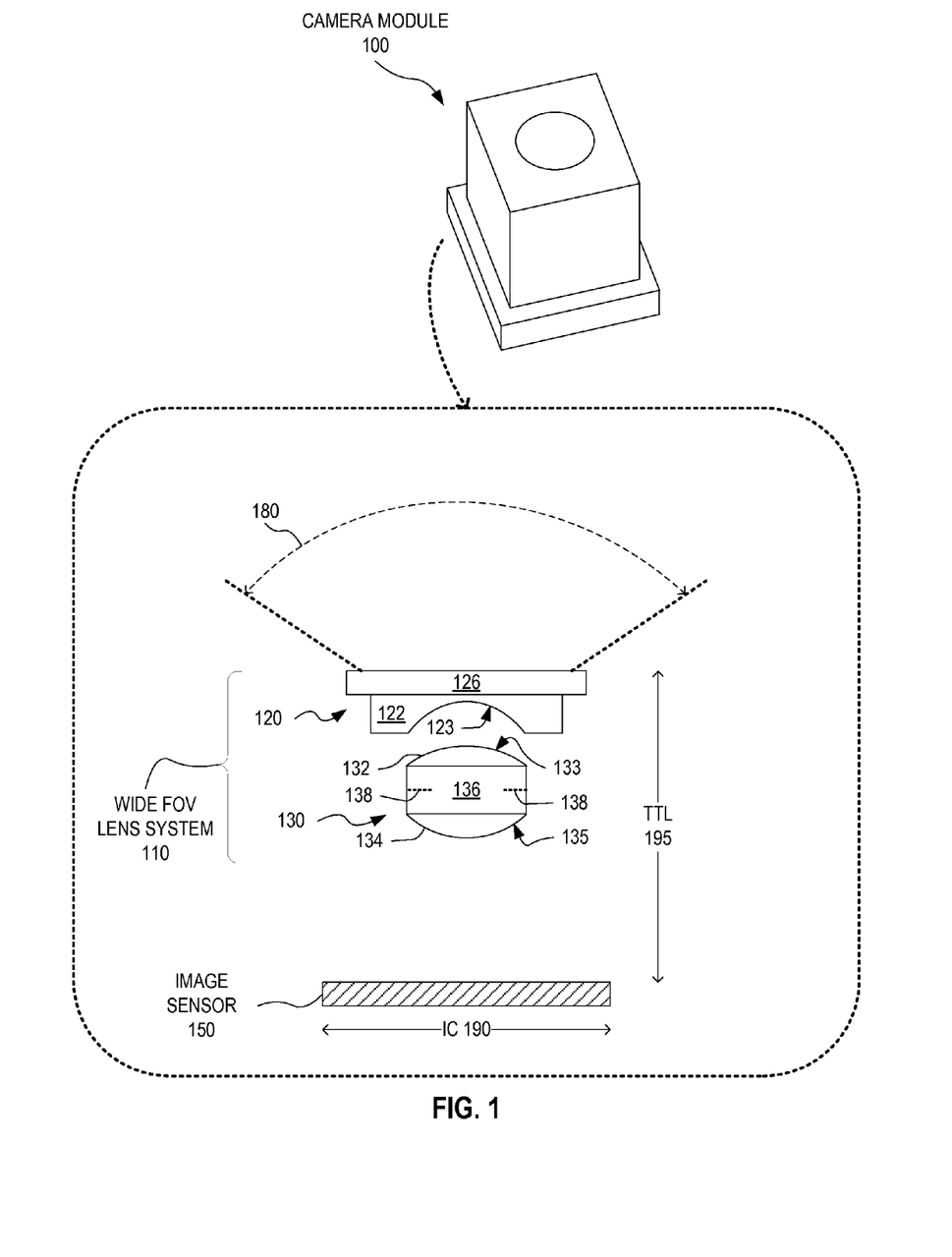
FIG. 1 illustrates a wide-FOV lens system implemented in an exemplary camera device, according to an embodiment.

FIG. 1 illustrates one exemplary wide-FOV lens system 110 implemented in one exemplary camera module 100. Camera module 100 is, for example, a camera cube configured for implementation in a portable device, such as a mobile phone, or in another device subject to tight spatial constraints. However, camera module 100 may be another type camera device without departing from the scope hereof. For example, camera module 100 may be a surveillance camera or an automotive camera. Wide-FOV lens system 110 is coupled with an image sensor 150 in camera module 100. Wide-FOV lens system 110 has a wide FOV characterized by a FOV angle 180. In one embodiment, FOV angle 180 is at least 145 degrees, for example 150 degrees.

Wide-FOV lens system 110 includes three lens surfaces 123, 133, and 135 that cooperate to achieve wide FOV imaging. Herein, a "lens surface" refers to a curved surface. In one embodiment, wide-FOV lens system 110 includes only these three lens surfaces, wherein lens surfaces 123 and 133 are separated by an air gap and lens surfaces 133 and 135 are separated by a solid portion. In another embodiment (not shown in FIG. 1), wide-FOV lens system 110 includes one or more additional lens surfaces. For example, wide-FOV lens system 110 may include one or more very slightly curved surfaces in addition to those shown in FIG. 1, without departing from the scope hereof.

Wide-FOV lens system 110 includes a one-sided wafer-level lens 120 and a two-sided wafer-level lens 130 optically coupled in series. Wafer-level lens 130 is disposed between wafer-level lens 120 and the image plane of wide-FOV lens system 110. One-sided wafer-level lens 120 includes a substrate 126 and a lens element 122 disposed on one surface of substrate 126. Lens element 122 is on the side of substrate 126 facing the image plane of wide-FOV lens system 110. Lens element 122 includes a lens surface 123 facing the image plane of wide-FOV lens system 110. In FIG. 1, the image plane of wide-FOV lens system 110 coincides with image sensor 150. Two-sided wafer-level lens 130 includes a substrate 136 and two lens elements 132 and 134 disposed on opposite facing surfaces of substrate 136. Lens element 132 is on a surface of substrate 136 facing away from the image plane of wide-FOV lens system 110. Lens element 134 is on a surface of substrate 136 facing the image plane of wide-FOV lens system 110. Lens element 132 includes a lens surface 133 facing away from the image plane of wide-FOV lens system 110, and lens element 134 includes a lens surface 135 facing the image plane of wide-FOV lens system 110.

In an embodiment, substrate 136 includes a aperture stop 138 located between lens elements 132 and 134. Aperture stop 138 is for example an opaque coating. Aperture stop 138 may serve to maintain, at least to a certain degree, the symmetry of each ray bundle respectively associated with a field location, such that the angular spread of a ray bundle before wafer-level lens 130 is similar to the angular spread of the corresponding ray bundle after wafer-level lens 130.

Wafer-level lenses 120 and 130 benefit from wafer-level mass-production methods to enable lower manufacturing cost than those associated with cast lenses or machined lenses. Furthermore, wafer-level production of wafer-level lens 130 allows for lens elements 132 and 134 to be made from a different material than that of substrate 136, as well as for lens elements 132 and 134 to be made from two different materials, respectively. Likewise, wafer-level production of wafer-level lens 120 allows for lens element 122 to be made from a different material than that of substrate 126. Such additional freedom of material choices, as compared to a cast or machined lens, provides additional flexibility to achieve desired performance characteristics of wafer-level lenses 120 and 130. In an embodiment, (a) lens element 122 is made of a different material than the material of substrate 126, (b) lens elements 132 and 134 are made from different materials than the material of substrate 136, and/or (c) lens elements 132 and 134 are made from two different materials, respectively.

Each of lens elements 122, 132, and 134 is integrally formed, that is, formed from one material and in one piece. Hence, each of lens elements 122, 132, and 134 is composed of a single material throughout. However, one or more of lens elements 122, 132, and 134 may include one or more surface coatings, such as an antireflective coating, without departing from the scope hereof.

In an embodiment, each of substrates 126 and 136 is substantially planar such that lens element 122 is disposed on a substantially planar surface of substrate 126, the surface of substrate 126 facing away from lens element 122 is substantially planar, and each of lens elements 132 and 134 is disposed on a substantially planar surface of substrate 136.

In the embodiment shown in FIG. 1, lens surface 123 is predominantly concave, while each of lens surfaces 133 and 135 is predominantly convex. However, the shapes of lens surfaces 123, 133, and 135 may be different from those shown in FIG. 1 without departing from the scope hereof. Possible lens surface include, but are not limited to, concave, convex, or a combination thereof such as a gull-wing shape. Additionally, each of lens surfaces 123, 133, and 135 may be a spherical or an aspheric lens surface.

In certain embodiments, wide-FOV lens system 110 is configured to operate in the visible spectral range. However, wide-FOV lens system 110 may be configured to operate in a different spectral range, for example in the near-infrared spectral range, without departing from the scope hereof. Each of wafer-level lenses 120 and 130 is at least partly transmissive to light in the spectral range, in which wide-FOV lens system is configured to operate.

Image sensor 150 is, for example, a complementary-metal-oxide semiconductor (CMOS) image sensor, a charged coupled device (CCD), or another focal plane array.

Wafer-level lenses 120 and 130 are manufacturable at the wafer-level and wide-FOV lens system 110 may therefore be manufactured at low cost and in high volume. In an embodiment, wide-FOV lens system 110 includes no other lenses that wafer-level lenses 120 and 130 and includes no other lens surfaces than lens surfaces 123, 133, and 135, which further simplifies the manufacturing process as compared to convention wide-FOV lens systems having many more lens elements and lens surfaces/interfaces.

The design of wide-FOV lens system 110 allows for wide FOV imaging in a compact package. In FIG. 1, the image circle wide-FOV lens system 110 is represented by the diameter 190 of the image circle (IC). In one embodiment, each of wafer-level lens 120 and wafer-level lens 130 has diameter less than IC diameter 190. This is in stark contrast to conventional wide-FOV lens systems, wherein the lens closest to the scene has a diameter that greatly exceeds the image circle diameter. In addition, the total track length (TTL) 195 of wide-FOV lens system 110 may be comparable to IC diameter 190 or at least only about 50% greater than IC diameter 190. For at least these reasons, wide-FOV lens system 110 may be combined with image sensor 150 in a camera module 100 that is significantly smaller than the package required when using a conventional wide-FOV lens system. Wide-FOV lens system 110 is therefore well-suited for incorporation into embodiments of camera module 100 having a small form factor.

TTL 195 is for example in the range between 3.2 millimeters (mm) and 3.6 mm, and IC diameter is for example in the range between 2.2 mm and 2.6 mm. In an embodiment, each of wafer-level lenses 120 and 130 has diameter less than 2.1 mm. Even with these form factors, wide-FOV lens system 110 may have a FOV angle 180 as large as approximately 150 degrees.

Herein, the "image circle" of a lens system refers to a collection or set of the farthest positions, with respect to the position of the optical axis, that the cone of light transmitted by the lens system can reach on the image plane. For axially symmetric lens systems such as those disclosed herein, this collection or set describes a circle on the image plane. The image circle is defined herein as the circle that coincides with full width at half maximum of the cone at the image plane. Herein, "total track length" of a lens system refers to the greatest distance, parallel to the optical axis of the lens system, from the image plane of the lens system to the surface farthest from the image plane. Thus, in FIG. 1, TTL 195 extends from the light receiving surface of image sensor 150 to the surface of substrate 126 most distal from image sensor 150.

Although shown in FIG. 1 as having side length matching IC diameter 190, the side length of image sensor 150 may be different from IC diameter 190. In one example, all of image sensor 150 is within IC diameter 190 such that the image formed on image sensor 150 by wide-FOV lens system 110 is free or at least nearly free of vignetting. In another example, at least a portion of the image circle characterized by IC diameter 190 is within image sensor 150, such that images captured by image sensor 150 exhibit some degree of vignetting.

Figure 2:
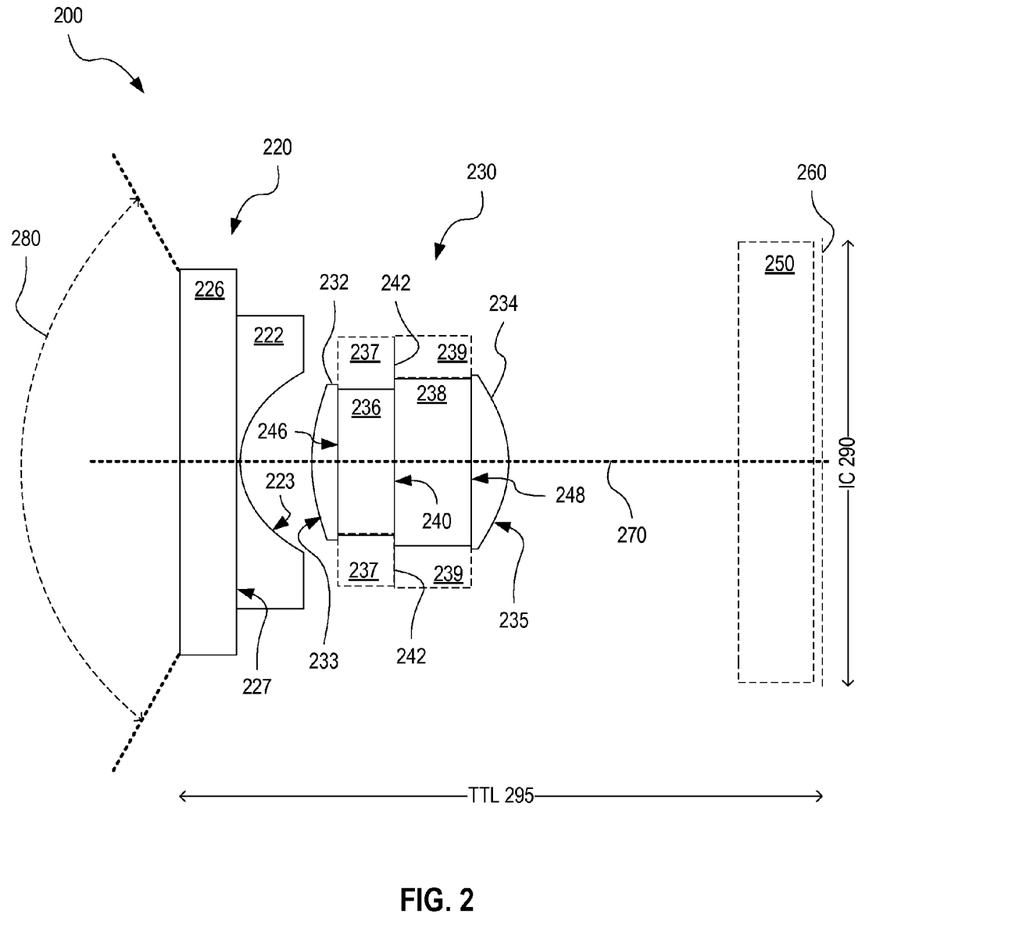
FIG. 2 illustrates one embodiment of the wide-FOV lens system of FIG. 1.

FIG. 2 illustrates one exemplary wide-FOV lens system 200 that has only three lens surface. Wide-FOV lens system 200 includes a one-sided wafer-level lens 220 and a two-sided wafer-level lens 230, optically coupled in series. Wide-FOV lens system 200 illustrates, by non-limiting example, the beneficial concepts discussed in connection with FIG. 1. While particular values of parameters for wide-FOV lens system 200 are disclosed, actual values may deviate from the disclosed values. A disclosed parameter value is a particular example of a range of values and may be extended to such a range of values. Wide FOV lens system 200 is an embodiment of wide-FOV lens system 110. Wafer-level lenses 220 and 230 are embodiments of wafer-level lenses 120 and 130, respectively.

Wide-FOV lens system 200 is configured to image a scene onto an image plane 260 with a cover glass 250 placed between wide-FOV lens system 200 and image plane 260. Cover glass 250 is, for example, made of glass, plastic, or a combination thereof. Wide-FOV lens system 200 has a total track length 295 and forms an image circle 290 on image plane 260. Wide-FOV lens system 200 has a FOV characterized by FOV angle 280. FIG. 2 further indicates the optical axis 270 of wide-FOV lens system 200.

Wafer-level lens 220 includes a substantially planar substrate 226 and a lens element 222 disposed on a substantially planar surface 227 of substrate 226. Surface 227 faces image plane 260. Lens element 222 has an aspheric concave lens surface 223 facing image plane 260. Substrate 226, lens element 222, and aspheric concave lens surface 223 are embodiments of substrate 126, lens element 122, and lens surface 123, respectively.

Wafer-level lens 230 includes two substantially planar substrates 236 and 238, a lens element 232, and a lens element 234. Substrates 236 and 238 are connected to each other at an interface 240. In one example, substrates 236 and 238 are bonded to each other. Lens element 232 is disposed on a substantially planar surface 246 of substrate 236. Surface 246 faces away from image plane 260. Lens element 232 includes an aspheric convex lens surface 233 facing away from image plane 260. Lens element 234 is disposed on a substantially planar surface 248 of substrate 238. Surface 248 faces away from image plane 260. Lens element 234 includes an aspheric convex lens surface 235 facing away from image plane 260. Wafer-level lens 230 includes a aperture stop 242 located at interface 240. Aperture stop 242 is, for example, an opaque coating. Lens elements 232 and 234 are embodiments of lens elements 132 and 134, respectively. Aspheric convex lens surfaces 233 and 235 are embodiments of lens surfaces 133 and 135, respectively. Substrates 236 and 238 together form an embodiment of substrate 136, and aperture stop 242 is an embodiment of aperture stop 138.

The use of two substrates (i.e., substrates 236 and 238) facilitates placement of aperture stop 242 between lens elements 232 and 234 and at a distance from both of lens elements 232 and 234. In contrast, if only one substrate was used, aperture stop 242 (at least if aperture stop 242 is a coating) would need to be placed at an interface between this substrate and either lens element 232 or lens element 234. If only such substrate-to-lens element interfaces were available for placement of a aperture stop, the aperture stop would have to be either (a) be placed very asymmetrically and be much closer to one side of the wafer-level lens than the other side of the wafer-level lens or (b) one of the lens elements would need to be very thick to achieve a more symmetric placement of the aperture stop with the aperture stop relatively centrally located within the wafer-level lens. In wide-FOV lens system 200, this issue is overcome by using a composite substrate with two substrates, substrates 236 and 238, such that aperture stop 242 may be placed at essentially any location within this composite substrate. In wide-FOV lens system 200, aperture stop 242 is relatively symmetrically placed between the side of wafer-level lens 230 further from image plane 260 and the side of wafer-level lens 230 closer to image plane 260 to preserve the symmetry of each ray bundle respectively associated with a field location, as discussed above in reference to FIG. 1.

Each of substrates 236 and 238 may have diameter greater than that shown in FIG. 2, without departing from the scope hereof. In one such example, substrate 236 includes an additional substrate portion 237 and substrate 238 includes an additional substrate portion 239, such that the diameter of substrate 236 is greater than the diameter of lens element 232 and the diameter of substrate 238 is greater than the diameter of lens element 234.

Without departing from the scope hereof, the diameter of one or more of lens elements 222, 232, and 234 and substrate 226 may be greater than shown in FIG. 2, although the optical performance presented below assumes optically active areas as illustrated in FIG. 2.

In operation, substrate 226 receives incident rays, which are collected by lens surface 223. Lens surface 233 adjusts the propagation direction of rays collected by lens surface 223 and directs these rays through aperture stop 242. Lens surface 235 bends bundles of rays from the respective field locations to reach image plane 260. Lens surface 235 also balances aberrations, especially distortion and coma, introduced by optical elements of wide-FOV lens system 200 upstream of lens surface 235.

Tables 1A and 1B lists the lens data of wide-FOV lens system 200. The lens data includes values of design parameters for substrates 226, 236, and 238, lens elements 222, 232, and 234, lens surfaces 223, 233, and 235, and aperture stop 242. The lens data also includes the configuration of cover glass (CG) 250, and a gap between cover glass 250 and image plane (IMA) 260. In addition, an assumed object location (OBJ) is listed together with a virtual surface located at the surface of substrate 226 furthest from image plane 260. The diameters of the object (OBJ) and the virtual surface defines a FOV angle 280 of 150 degrees. Material properties and thicknesses of each of substrate 226, lens element 222, lens element 232, substrate 236, substrate 238, lens element 234, and cover glass 250 are indicated in Table 1A in the same row as the first surface of the respective element, as viewed from the object side. Material properties indicated in Table 1A are (a) the index of refraction $n_D$ at the Fraunhofer D-line $\lambda_D$=589.3, and (b) the Abbe number. The Abbe number is a measure of optical dispersion in a material and is defined as $V_d = (n_D-1)/(n_F-n_C)$, where $n_F$ and $n_C$ are the indices of refraction at the Fraunhofer F-line $\lambda_F$=486.1 nm and the Fraunhofer C-line $\lambda_C$=656.3 nm, respectively.

Table 1B lists the aspheric coefficients of each of lens surfaces 223, 233, and 235. For each of these aspheric lens surfaces, the surface profile can be expressed as $$Z(s) = \frac{Cs^1}{1+\sqrt{1-(1+k)C^2s^2}} + A_4 s^4 + A_6 s^6 + \ldots,$$

where Z is the surface sag parallel to optical axis 270 as a function of the radial distance s from optical axis 270, C is the inverse of the radius of curvature, k is the conic constant, and $A_4, A_6, \ldots$ are the $4^{th}, 6^{th}, \ldots$ order aspheric terms.

Wide-FOV lens system 200 has a working F-number of 2.97, effective focal length EFFL of 0.922 mm, IC diameter 290 of 2.402 mm, and TTL 295 of 3.42 mm. It follows that TTL/IC=1.42 for wide-FOV lens system 200. Furthermore, the air gap between lens elements 222 and 232, on optical axis 270, is such that 0.46<[length of air gap]*(TTL 295/IC 290)<0.55.

As evident from Table 1A, lens element 232 is of a material different from that of lens element 234, while lens elements 222 and 234 have the same material properties in terms of index of refraction and Abbe number. For example, the Abbe number of lens element 232 is smaller than the Abbe number of lens elements 222 and 234, which helps ensure imaging by wide-FOV lens system 200 at high resolution. In one example, lens elements 222, 232, and 234 may be made from a polymer such as an epoxy.

The diameter of wafer-level lens 220 is less than the diameter of IC 290, and the diameter of wafer-level lens 230 is less than the diameter of wafer-level lens 220. This allows for packaging of wide-FOV lens system 200 with image sensor 150 in a compact camera module 100, wherein the radial extent of the packaging of camera module 100 away from optical axis 270 is defined by image sensor 150 as opposed to by one or more elements of wide-FOV lens system 200.

TABLE 1A

| Surface | Radius of curvature [mm] | Thickness [mm] | $n_D$ | $V_d$ | Diameter [mm] |
|---|---|---|---|---|---|
| OBJ | Infinity | 100.00 | | | 796.20 |
| Virtual surface | Infinity | 0.00 | | | 2.07 |
| 226 | Infinity | 0.30 | 1.52 | 62.6 | 1.57 |
| 222 | Infinity | 0.02 | 1.51 | 57.0 | 1.57 |
| 223 | 0.444 | 0.38 | | | 0.97 |
| 232/233 | 0.969 | 0.14 | 1.59 | 31.2 | 0.84 |
| 236 | Infinity | 0.30 | 1.52 | 62.6 | 0.78 |
| 238/STO | Infinity | 0.41 | 1.52 | 62.6 | 0.50 |
| 234 | Infinity | 0.20 | 1.51 | 57.0 | 0.90 |
| 235 | −0.613 | 1.22 | | | 0.93 |
| CG | Infinity | 0.40 | 1.52 | 62.6 | 2.14 |
| Gap | Infinity | 0.05 | | | 2.36 |
| IMA 260 | Infinity | | | | 2.402 |

TABLE 1B

| Surface | Aspheric coefficient | | | | | | |
|---|---|---|---|---|---|---|---|
| | k | $A_4$ | $A_6$ | $A_8$ | $A_{10}$ | $A_{12}$ | $A_{14}$ |
| 223 | −0.3921 | 0.2954 | −4.1345 | 29.0426 | −84.0921 | −0.5717 | 0.0000 |
| 233 | 2.5324 | −0.7270 | 1.1363 | −20.2162 | 14.3662 | −7.0933 | 0.0000 |
| 235 | −8.8616 | −3.1789 | 15.0733 | −41.3248 | 65.5260 | −29.5543 | 15.0498 |

FIGS. 3A, 3B, 3C, and 3D show the optical performance of wide-FOV lens system 200 (FIG. 2), as evaluated by the Zemax® Optical Design Program. FIGS. 3A, 3B, 3C, and 3D show spherical aberration, f-theta distortion, field curvature, and lateral color, respectively, of wide-FOV lens system 200, assuming location of object (OBJ) and image plane (IMA) 260 as indicated in Table 1A. As demonstrated by FIGS. 3A, 3B, 3C, and 3D, wide-FOV lens system 200 produces an image on image plane 260 of high optical quality.

Figure 3A:
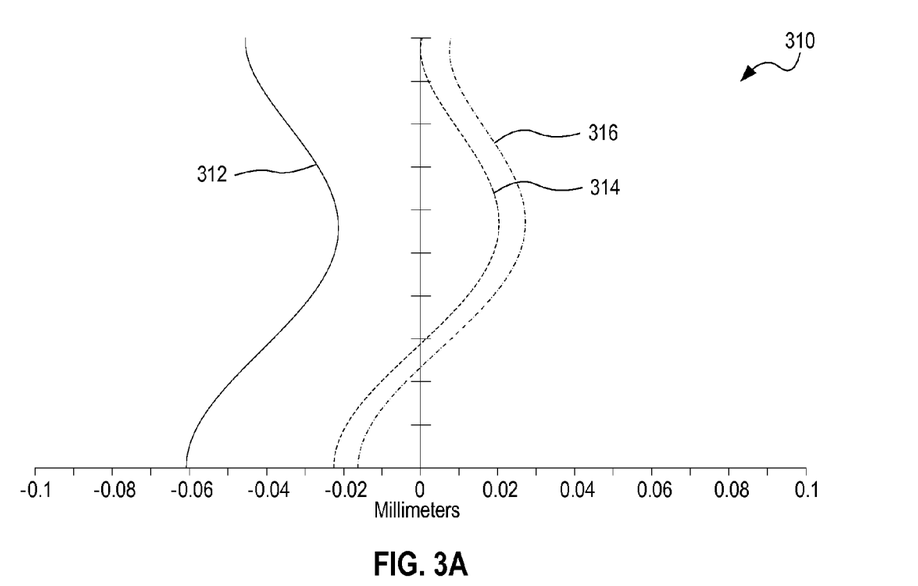
FIG. 3A is a plot of the longitudinal spherical aberration of the wide-FOV lens system of FIG. 2.

FIG. 3A is a plot of the longitudinal spherical aberration of wide-FOV lens system 200. FIG. 3A shows the longitudinal spherical aberration in millimeters, displayed on the horizontal axis, as a function of entrance pupil height, displayed on the vertical axis. The vertical axis extends from optical axis 270 to the most extreme radial distance from optical axis 270 associated with FOV angle 280. The maximum entrance pupil radius is $r_p$=0.1646 mm. Longitudinal spherical aberration curves 312 (solid line), 314 (dashed line), and 316 (dash-dot line) are computed at 470 nm, 575 nm, and 600 nm, respectively.

Figure 3B:
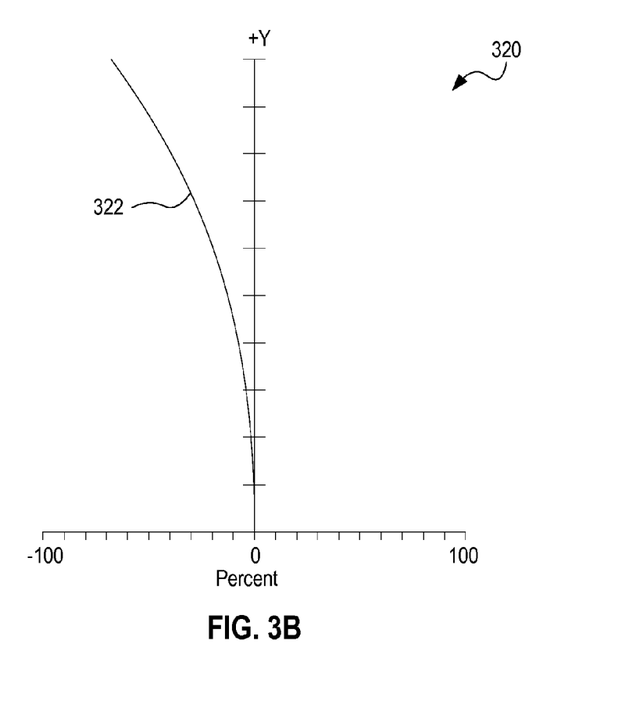
FIG. 3B is a plot of the f-theta distortion of the wide-FOV lens system of FIG. 2.

FIG. 3B is a plot of the f-theta distortion of wide-FOV lens system 200. FIG. 3B shows the f-theta distortion in percent, displayed on the horizontal axis, as a function of field angle, displayed on the vertical axis. The vertical axis extends from optical axis 270 to the most extreme location bounded by FOV angle 280. Thus, the maximum field angle plotted in FIG. 3B is $\theta_{max}$=72.872°. The distortion is computed at 470 nm and is indicated by distortion curve 322.

Figure 3C:
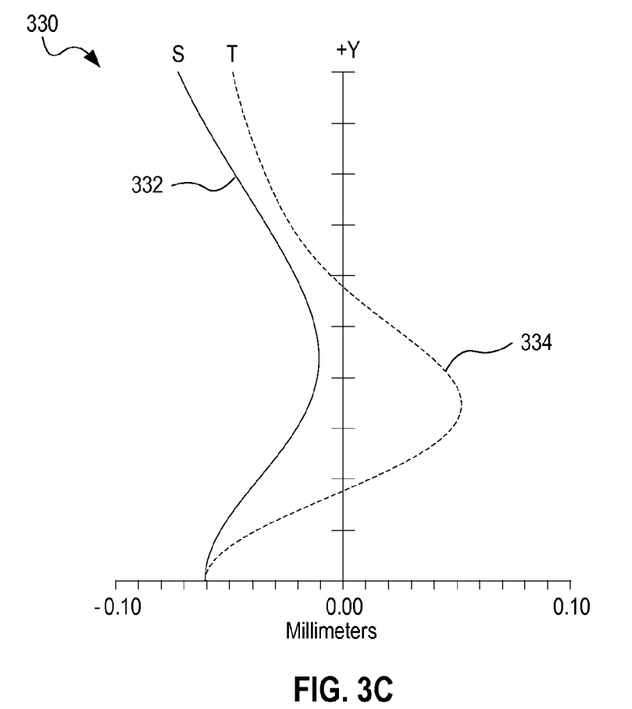
FIG. 3C is a plot of the Petzval field curvature of the wide-FOV lens system of FIG. 2.

FIG. 3C is a plot of the Petzval field curvature of wide-FOV lens system 200. The field curvature is plotted in millimeters, displayed on the horizontal axis, for field angles between zero and $\theta_{max}$=72.872°, displayed on the vertical axis. Field curvature 332 and field curvature 334 are computed at 470 nm in the sagittal and tangential planes, respectively.

Figure 3D:
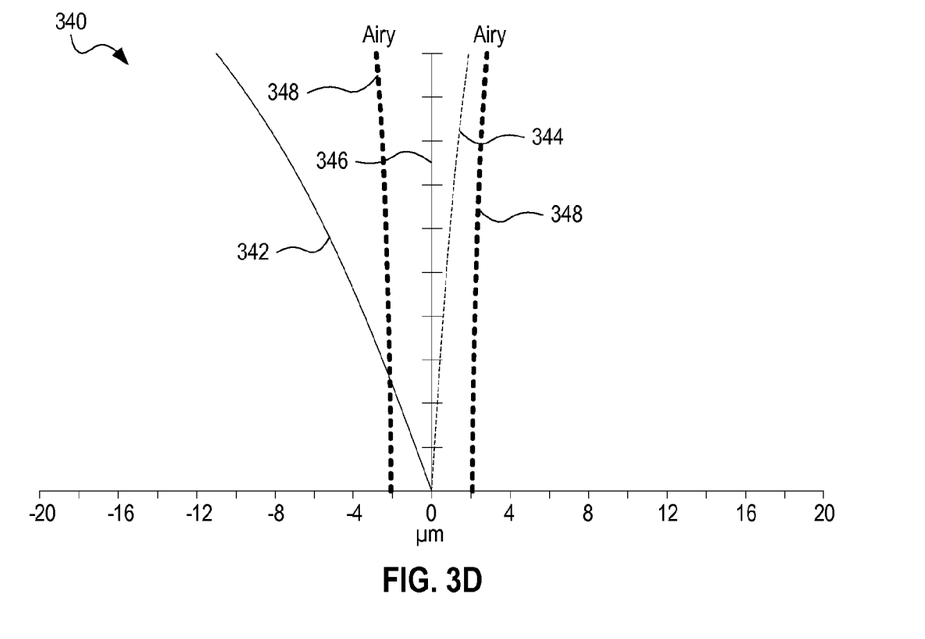
FIG. 3D is a plot of the lateral color error for the wide-FOV lens system of FIG. 2.

FIG. 3D is a plot of the lateral color error, also known as transverse chromatic aberration, for wide-FOV lens system 200. FIG. 3D shows the lateral color error in microns, displayed on the horizontal axis, as a function of field height, displayed on the vertical axis. The vertical axis extends from optical axis 270 to the most extreme radial distance from optical axis 270 associated with IC 290. Field height ranges from $h_{min}$=0 (on-axis) to $h_{max}$=1.200 mm. Lateral color is referenced to 575 nm, such that the lateral color 344 for 575 nm is zero for all field heights. Lateral color 342 is computed at 470 nm. Lateral color 346 is computed at 600 nm.

Figure 4:
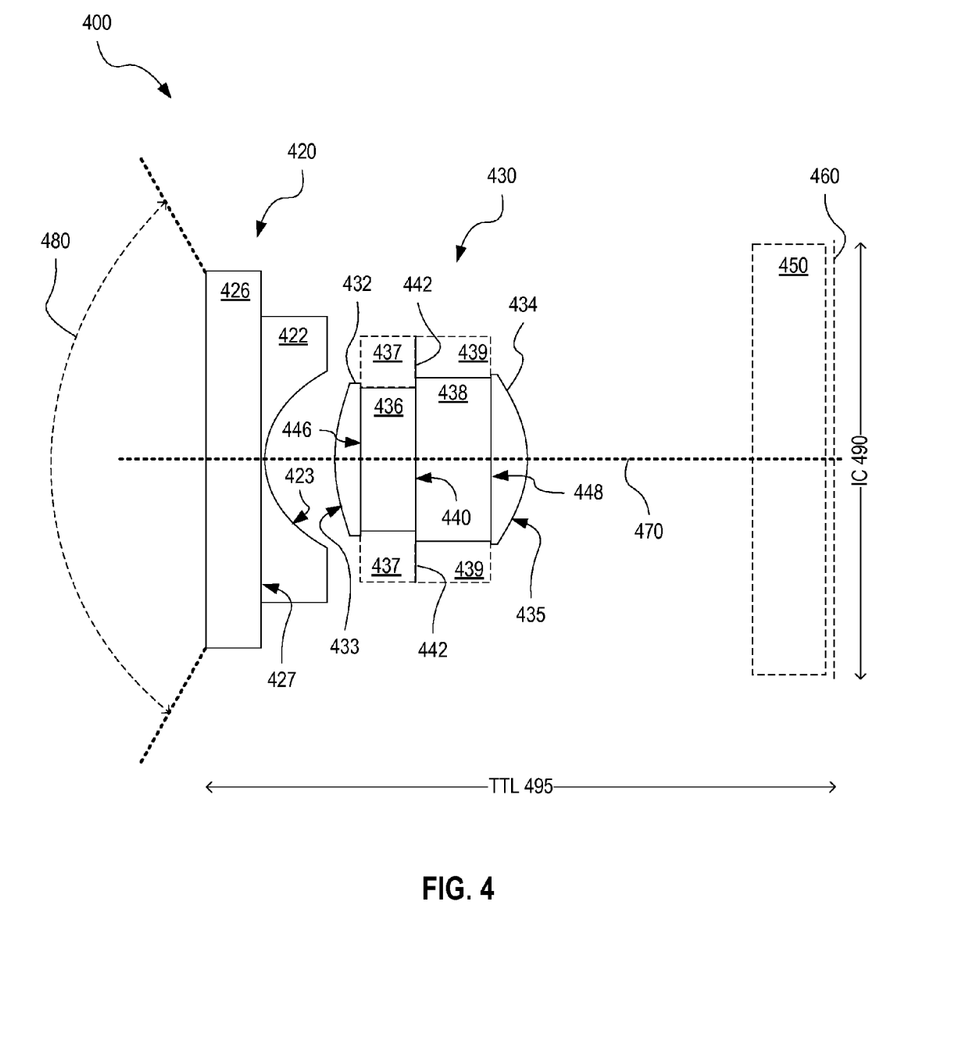
FIG. 4 illustrates another embodiment of the wide-FOV lens system of FIG. 1.

FIG. 4 illustrates one exemplary wide-FOV lens system 400 that has only three lens surface. Wide-FOV lens system 400 includes a one-sided wafer-level lens 420 and a two-sided wafer-level lens 430, optically coupled in series. Wide-FOV lens system 400 illustrates, by non-limiting example, the beneficial concepts discussed in connection with FIG. 1. While particular values of parameters for wide-FOV lens system 400 are disclosed, actual values may deviate from the disclosed values. A disclosed parameter value is a particular example of a range of values and may be extended to such a range of values. Wide FOV lens system 400 is an embodiment of wide-FOV lens system 110. Wafer-level lenses 420 and 430 are embodiments of wafer-level lenses 120 and 130, respectively.

Wide-FOV lens system 400 is configured to image a scene onto an image plane 460 with a cover glass 450 placed between wide-FOV lens system 400 and image plane 460. Cover glass 450 is, for example, made of glass, plastic, or a combination thereof. Wide-FOV lens system 400 has a total track length 495 and forms an image circle 490 on image plane 460. Wide-FOV lens system 400 has a FOV characterized by FOV angle 480. FIG. 4 further indicates the optical axis 470 of wide FOV lens system 400.

Wafer-level lens 420 includes a substantially planar substrate 426 and a lens element 422 disposed on a substantially planar surface 427 of substrate 426. Surface 427 faces image plane 460. Lens element 422 has an aspheric concave lens surface 423 facing image plane 460. Substrate 426, lens element 422, and aspheric concave lens surface 423 are embodiments of substrate 126, lens element 122, and lens surface 123, respectively.

Wafer-level lens 430 includes two substantially planar substrates 436 and 438, a lens element 432, and a lens element 434. Substrates 436 and 438 are connected to each other at an interface 440. In one example, substrates 436 and 438 are bonded to each other. Lens element 432 is disposed on a substantially planar surface 446 of substrate 436. Surface 446 faces away from image plane 460. Lens element 432 includes an aspheric convex lens surface 433 facing away from image plane 460. Lens element 434 is disposed on a substantially planar surface 448 of substrate 438. Surface 448 faces away from image plane 460. Lens element 434 includes an aspheric convex lens surface 435 facing away from image plane 460. Wafer-level lens 430 includes a aperture stop 442 located at interface 440. Aperture stop 442 is, for example, an opaque coating. Lens elements 432 and 434 are embodiments of lens elements 132 and 134, respectively. Aspheric convex lens surfaces 433 and 435 are embodiments of lens surfaces 133 and 135, respectively. Substrates 436 and 438 together form an embodiment of substrate 136, and aperture stop 442 is an embodiment of aperture stop 138.

The use of two substrates (i.e., substrates 436 and 438) facilitates placement of aperture stop 442 between lens elements 432 and 434 and at a distance from both of lens elements 432 and 434, as discussed in more detail above in reference to substrates 236 and 238 of FIG. 2.

Each of substrates 436 and 438 may have diameter greater than that shown in FIG. 4, without departing from the scope hereof. In one such example, substrate 436 includes an additional substrate portion 437 and substrate 438 includes an additional substrate portion 439, such that the diameter of substrate 436 is greater than the diameter of lens element 432 and the diameter of substrate 438 is greater than the diameter of lens element 434.

Without departing from the scope hereof, the diameter of one or more of lens elements 422, 432, and 434 and substrate 426 may be greater than shown in FIG. 4, although the optical performance presented below assumes optically active areas as illustrated in FIG. 4.

In operation, substrate 426 receives incident rays, which are collected by lens surface 423. Lens surface 433 adjusts the propagation direction of rays collected by lens surface 423 and directs these rays through aperture stop 442. Lens surface 435 bends bundles of rays from the respective field locations to reach image plane 460. Lens surface 435 also balances aberrations, especially distortion and coma, introduced by optical elements of wide-FOV lens system 400 upstream of lens surface 435.

Tables 2A and 2B lists the lens data of wide-FOV lens system 400. The lens data includes values of design parameters for substrates 426, 436, and 438, lens elements 422, 432, and 434, lens surfaces 423, 433, and 435, and aperture stop 442. The lens data also includes the configuration of cover glass (CG) 450, and a gap between cover glass 450 and image plane (IMA) 460. In addition, an assumed object location (OBJ) is listed together with a virtual surface located at the surface of substrate 426 furthest from image plane 460. The diameters of the object (OBJ) and the virtual surface defines a FOV angle 480 of 150 degrees. Material properties and thicknesses of each of substrate 426, lens element 422, lens element 432, substrate 436, substrate 438, lens element 434, and cover glass 450 are indicated in Table 2A in the same row as the first surface of the respective element, as viewed from the object side. Material properties indicated in Table 2A are (a) the index of refraction $n_D$ at the Fraunhofer D-line $\lambda_D$=589.3, and (b) the Abbe number.

Table 2B lists the aspheric coefficients of each of lens surfaces 423, 433, and 435.

Wide-FOV lens system 400 has a working F-number of 2.94, effective focal length EFFL of 0.823 mm, IC diameter 490 of 2.396 mm, and TTL 495 of 3.34 mm. It follows that TTL/IC=1.39 for wide-FOV lens system 400. Furthermore, the air gap between lens elements 422 and 432, on optical axis 470, is such that 0.46<[length of air gap]*(TTL 495/IC 490)<0.55.

As evident from Table 2A, lens element 432 is of a material different from that of lens element 434, while lens elements 422 and 434 have the same material properties in terms of index of refraction and Abbe number. For example, the Abbe number of lens element 432 is smaller than the Abbe number of lens elements 422 and 434, which helps ensure imaging by wide-FOV lens system 400 at high resolution. In one example, lens elements 422, 432, and 434 may be made from a polymer such as an epoxy.

The diameter of wafer-level lens 420 is less than the diameter of IC 490, and the diameter of wafer-level lens 430 is less than the diameter of wafer-level lens 420. This allows for packaging of wide-FOV lens system 400 with image sensor 150 in a compact camera module 100, wherein the radial extent of the packaging of camera module 100 away from optical axis 470 is defined by image sensor 150 as opposed to by one or more elements of wide-FOV lens system 400.

TABLE 2A

| Surface | Radius of curvature [mm] | Thickness [mm] | $n_D$ | $V_d$ | Diameter [mm] |
|---|---|---|---|---|---|
| OBJ | Infinity | 500.00 | | | 3811.96 |
| Virtual surface | Infinity | 0.00 | | | 2.03 |
| 426 | Infinity | 0.30 | 1.52 | 62.6 | 2.03 |
| 422 | Infinity | 0.02 | 1.51 | 57.0 | 1.54 |
| 423 | 0.369 | 0.33 | | | 0.94 |
| 432/433 | 0.771 | 0.14 | 1.59 | 31.2 | 0.83 |
| 436 | Infinity | 0.30 | 1.52 | 62.6 | 0.79 |
| 438/STO | Infinity | 0.41 | 1.52 | 62.6 | 0.45 |
| 434 | Infinity | 0.30 | 1.51 | 57.0 | 0.97 |
| 435 | −0.575 | 1.09 | | | 0.97 |
| CG | Infinity | 0.40 | 1.52 | 62.6 | 2.13 |
| Gap | Infinity | 0.05 | | | 2.36 |
| IMA 460 | Infinity | | | | 2.396 |

TABLE 2B

| | Aspheric coefficient | | | | | | |
|---|---|---|---|---|---|---|---|
| Surface | k | $A_4$ | $A_6$ | $A_8$ | $A_{10}$ | $A_{12}$ | $A_{14}$ |
| 423 | −0.4571 | 0.0387 | −14.8750 | 101.4878 | −371.0602 | −0.5717 | 0.0000 |
| 433 | 1.5166 | −1.2778 | 9.6213 | −111.8843 | 270.5912 | −7.0933 | 0.0000 |
| 435 | −7.2119 | −3.0706 | 14.8172 | −41.5051 | 67.3291 | −29.5543 | 15.0798 |

FIGS. 5A, 5B, 5C, and 5D show the optical performance of wide-FOV lens system 400 (FIG. 4), as evaluated by the Zemax® Optical Design Program. FIGS. 5A, 5B, 5C, and 5D show spherical aberration, f-theta distortion, field curvature, and lateral color, respectively, of wide-FOV lens system 400, assuming location of object (OBJ) and image plane (IMA) 460 as indicated in Table 2A. As demonstrated by FIGS. 5A, 5B, 5C, and 5D, wide-FOV lens system 400 produces an image on image plane 460 of high optical quality.

Figure 5A:
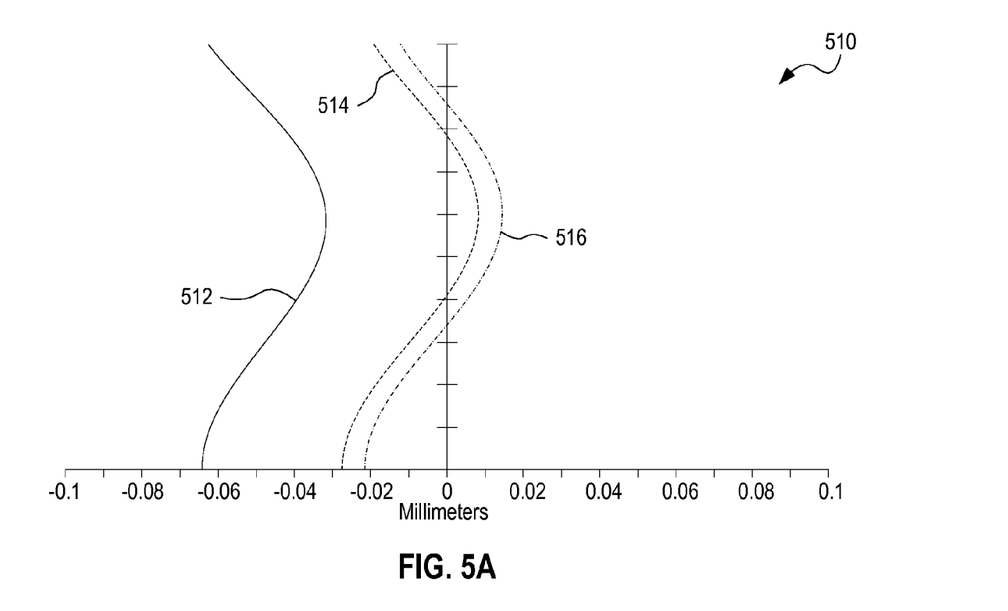
FIG. 5A is a plot of the longitudinal spherical aberration of the wide-FOV lens system of FIG. 4.

FIG. 5A is a plot of the longitudinal spherical aberration of wide-FOV lens system 400. FIG. 5A shows the longitudinal spherical aberration in millimeters, displayed on the horizontal axis, as a function of entrance pupil height, displayed on the vertical axis. The vertical axis extends from optical axis 470 to the most extreme radial distance from optical axis 470 associated with FOV angle 480. The maximum entrance pupil radius is $r_p=0.1475$ mm. Longitudinal spherical aberration curves 512 (solid line), 514 (dashed line), and 516 (dash-dot line) are computed at 470 nm, 575 nm, and 600 nm, respectively.

Figure 5B:
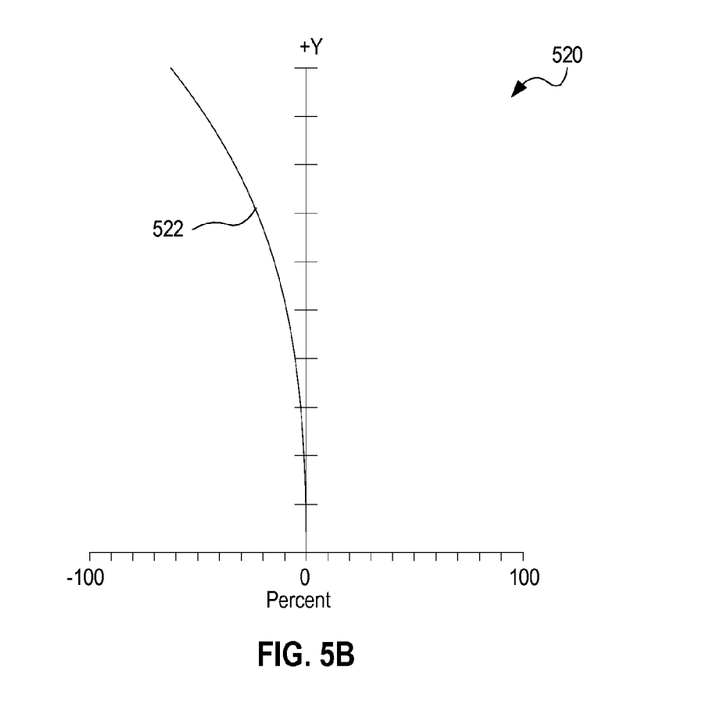
FIG. 5B is a plot of the f-theta distortion of the wide-FOV lens system of FIG. 4.

FIG. 5B is a plot of the f-theta distortion of wide-FOV lens system 400. FIG. 5B shows the f-theta distortion in percent, displayed on the horizontal axis, as a function of field angle, displayed on the vertical axis. The vertical axis extends from optical axis 470 to the most extreme location bounded by FOV angle 480. Thus, the maximum field angle plotted in FIG. 5B is $\theta_{max}=75.295°$. The distortion is computed at 470 nm and is indicated by distortion curve 522.

Figure 5C:
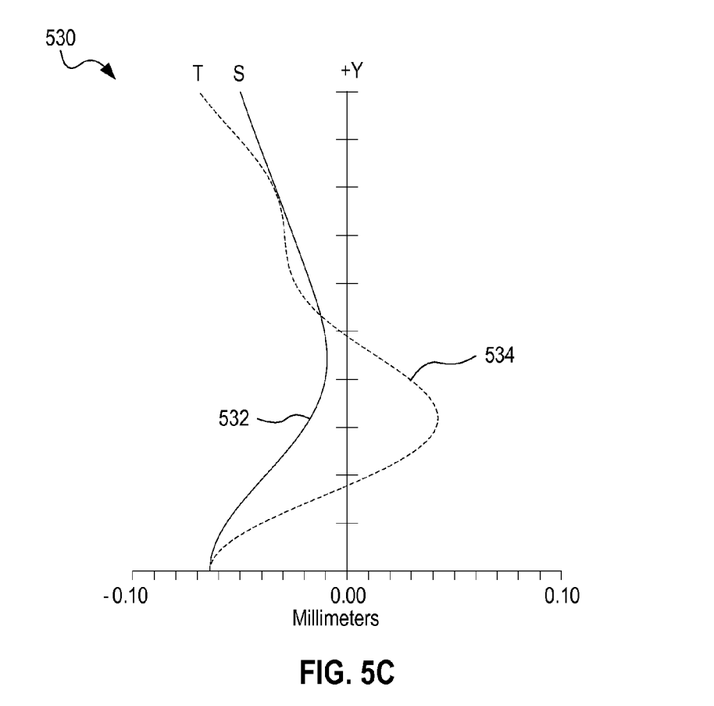
FIG. 5C is a plot of the Petzval field curvature of the wide-FOV lens system of FIG. 4.

FIG. 5C is a plot of the Petzval field curvature of wide-FOV lens system 400. The field curvature is plotted in millimeters, displayed on the horizontal axis, for field angles between zero and $\theta_{max}=75.295°$, displayed on the vertical axis. Field curvature 532 and field curvature 534 are computed at 470 nm in the sagittal and tangential planes, respectively.

Figure 5D:
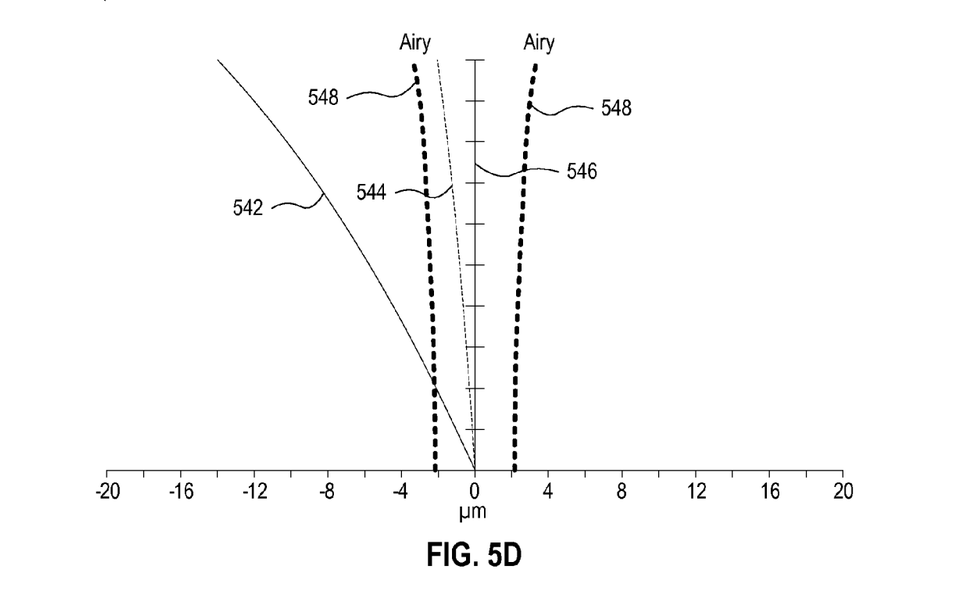
FIG. 5D is a plot of the lateral color error for the wide-FOV lens system of FIG. 4.

FIG. 5D is a plot of the lateral color error, also known as transverse chromatic aberration, for wide-FOV lens system 400. FIG. 5D shows the lateral color error in microns, displayed on the horizontal axis, as a function of field height, displayed on the vertical axis. The vertical axis extends from optical axis 470 to the most extreme radial distance from optical axis 470 associated with IC 490. Field height ranges from $h_{min}=0$ (on-axis) to $h_{max}=1.200$ mm. Lateral color is referenced to 575 nm, such that the lateral color 544 for 575 nm is zero for all field heights. Lateral color 542 is computed at 470 nm. Lateral color 546 is computed at 600 nm.

Figure 6:
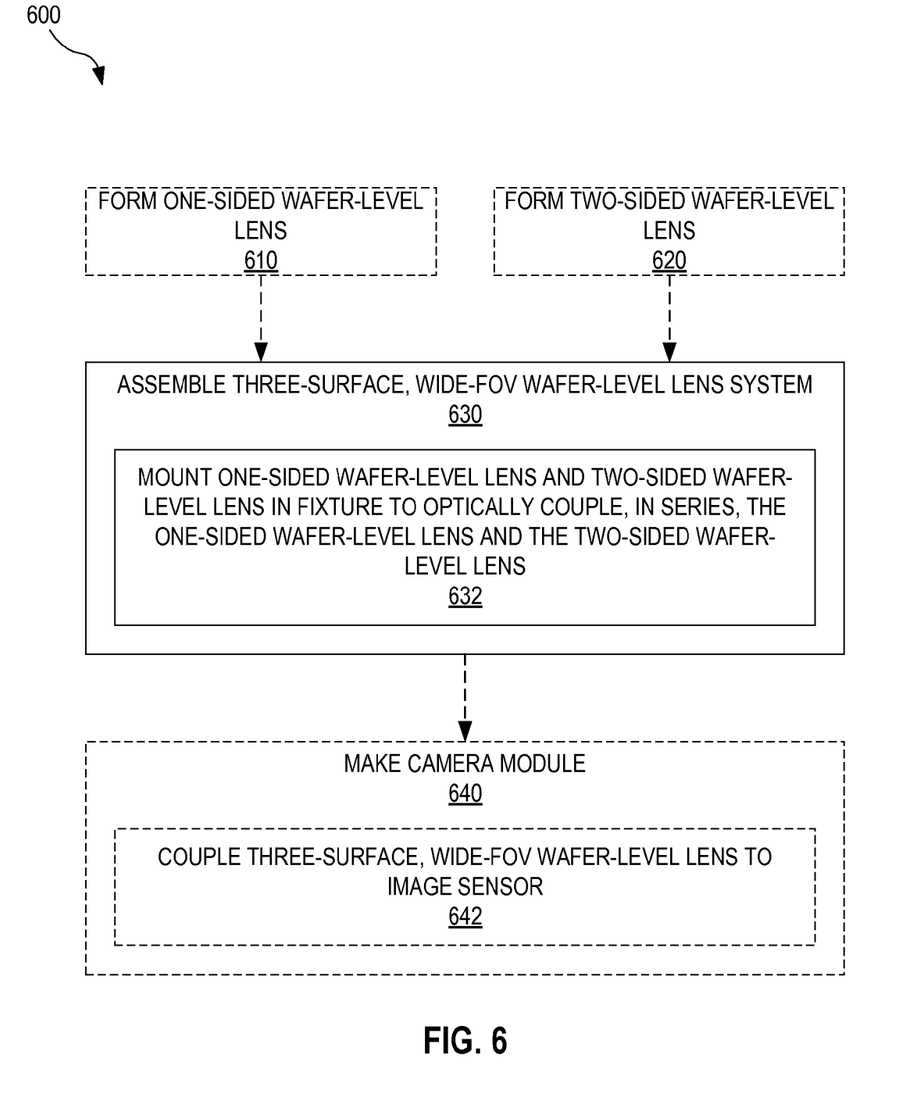
FIG. 6 illustrates a method for manufacturing a wide-FOV lens system, according to an embodiment.

FIG. 6 illustrates one exemplary method 600 for manufacturing wide-FOV lens system 110 (FIG. 1). Method 600 may be used to form wide-FOV lens system 110 according to the lens specification of wide-FOV lens system 200 (FIG. 2) or according to the lens specification of wide-FOV lens system 400 (FIG. 4).

In a step 630, method 600 assembles wide-FOV lens system 110. Step 630 includes a step 632, wherein wafer-level lenses 120 and 130 are mounted in a fixture to optically couple wafer-level lenses 120 and 130 in series. In one example, step 632 utilizes methods known in the art to mount wafer-level lenses 120 and 130 in a fixture.

Optionally, step 630 is preceded by steps 610 and 620 of forming wafer-level lenses 120 and 130, respectively, using wafer-level lens manufacturing technology.

In an embodiment, method 600 further includes a step 640 of making camera module 100 based upon wide-FOV lens system 110, as assembled in step 630. Step 640 includes a step 642 of coupling wide-FOV lens system 110 to image sensor 150 to form camera module 100. In one example, the fixture of step 632 is configured for mounting onto an electronic circuit board that includes image sensor 150.

Figure 7:
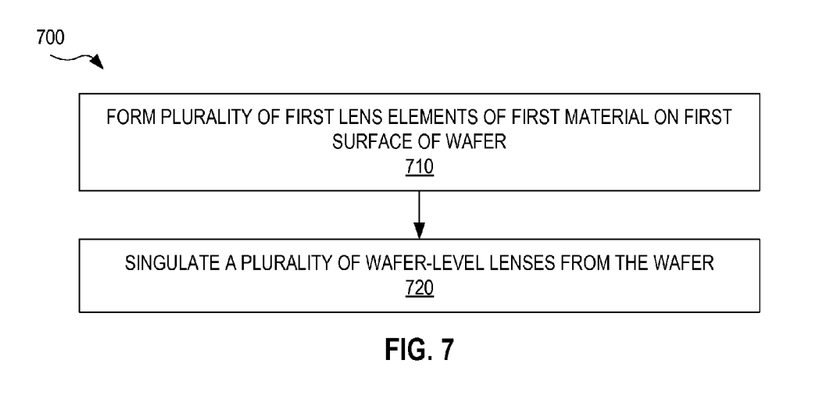
FIG. 7 illustrates a method for forming a plurality of one-sided wafer-level lenses, according to an embodiment.

FIG. 7 illustrates one exemplary method 700 for forming one-sided wafer-level lenses, such as wafer-level lens 120. Step 610 of method 600 may implement method 700.

In a step 710, a plurality of lens elements 122 are formed on a first surface of a wafer made of the material associated with substrate 126. In one embodiment of step 710, the plurality of lens elements are molded on the first surface of the wafer. For example, a resin (such as a polymer resin) is deposited onto the first surface of the wafer; a mold with a plurality of recesses, each of shape complimentary to lens surface 123, is placed on the first surface (with the resin), the resin is cured, and the mold is removed from the first surface. The resin may be an ultraviolet (UV) curable epoxy that is cured by shining UV light through the wafer to the resin on the first surface.

In a step 720, a plurality of wafer-level lenses 120 are singulated from the wafer. The wafer is diced, for example using methods known in the art, to form the plurality of wafer-level lenses 120.

Figure 8:
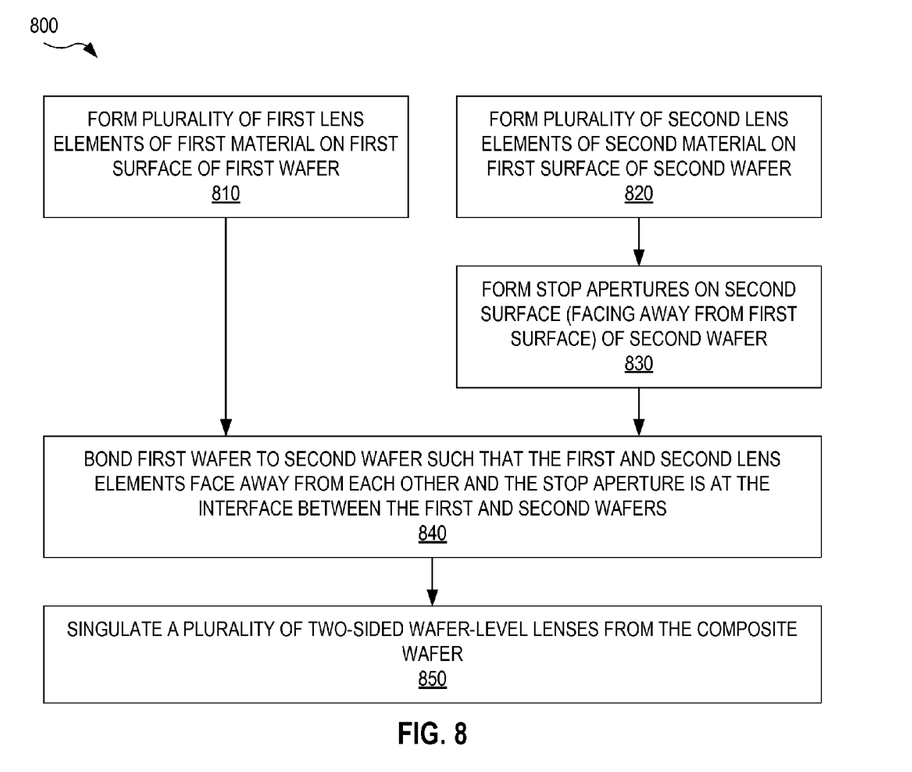
FIG. 8 illustrates a method for producing a plurality of two-sided wafer-level lenses having an internal aperture stop, according to an embodiment.

FIG. 8 illustrates one exemplary method 800 for forming two-sided wafer-level lenses each having an internal aperture stop, such as wafer-level lens 230 or 430 or an embodiment of wafer-level lens 130 having a aperture stop 138. Step 620 of method 600 may implement method 800.

In a step 810, a plurality of lens elements 132 of a first material are formed on a first surface of a wafer made of the material associated with substrate 136. In one embodiment of step 810, the plurality of lens elements 132 are molded on the first surface of the wafer. For example, a resin (such as a polymer resin) is deposited onto the first surface of the wafer; a mold with a plurality of recesses, each of shape complimentary to lens surface 133, is placed on the first surface (with the resin), the resin is cured, and the mold is removed from the first surface. The resin may be an ultraviolet (UV) curable epoxy that is cured by shining UV light through the wafer to the resin on the first surface. In one example of step 810, a plurality of lens elements 232 are formed on a wafer made of the material associated with substrate 236.

In a step 820, a plurality of lens elements 134 of a second material are formed on a first surface of a second wafer. Step 820 may utilize the same method as step 710, however using a mold with a plurality of recesses, each of which have shape complimentary to lens surface 135. In one example of step 820, a plurality of lens elements 234 are formed on a wafer made of the material associated with substrate 238. In one embodiment, the first material is different from the second material.

In a step 830, a plurality of aperture stops is formed on a second surface of the second wafer, wherein the second surface of the second wafer faces away from the first surface of the second wafer. The aperture stops are respectively aligned with the lens elements formed in step 820. In one example of step 830, a plurality of aperture stops 242 is formed on the wafer made of the material associated with substrate 238 and discussed in reference to step 820.

In a step 840, the first wafer is bonded to the second wafer such that lens elements 132 face away from lens elements 134 and such that the aperture stop is at the interface between the first and second wafers. In one example of step 840, a wafer made of the material associated with substrate 236, and having a plurality lens elements 232, is bonded to a wafer made of the material associated with substrate 238, and having a plurality lens elements 234 and a plurality of aperture stops 242, such that aperture stops 242 are at the interface between these two wafers.

In a step 850, a plurality of wafer-level lenses 130 are singulated from the wafer formed in step 840. The wafer is diced, for example using methods known in the art, to form the plurality of wafer-level lenses 130 with aperture stops 138 internally within a two-substrate embodiment of substrate 136. In one example of step 850, the wafer produced in step 840 is singulated to form a plurality of wafer-level lenses 230.

Without departing from the scope hereof, the order of steps 820 and 830 may be reversed. Furthermore, the aperture stops formed in step 830 may instead be formed on the first wafer either before or after performing step 810, without departing from the scope hereof.

Figure 9:
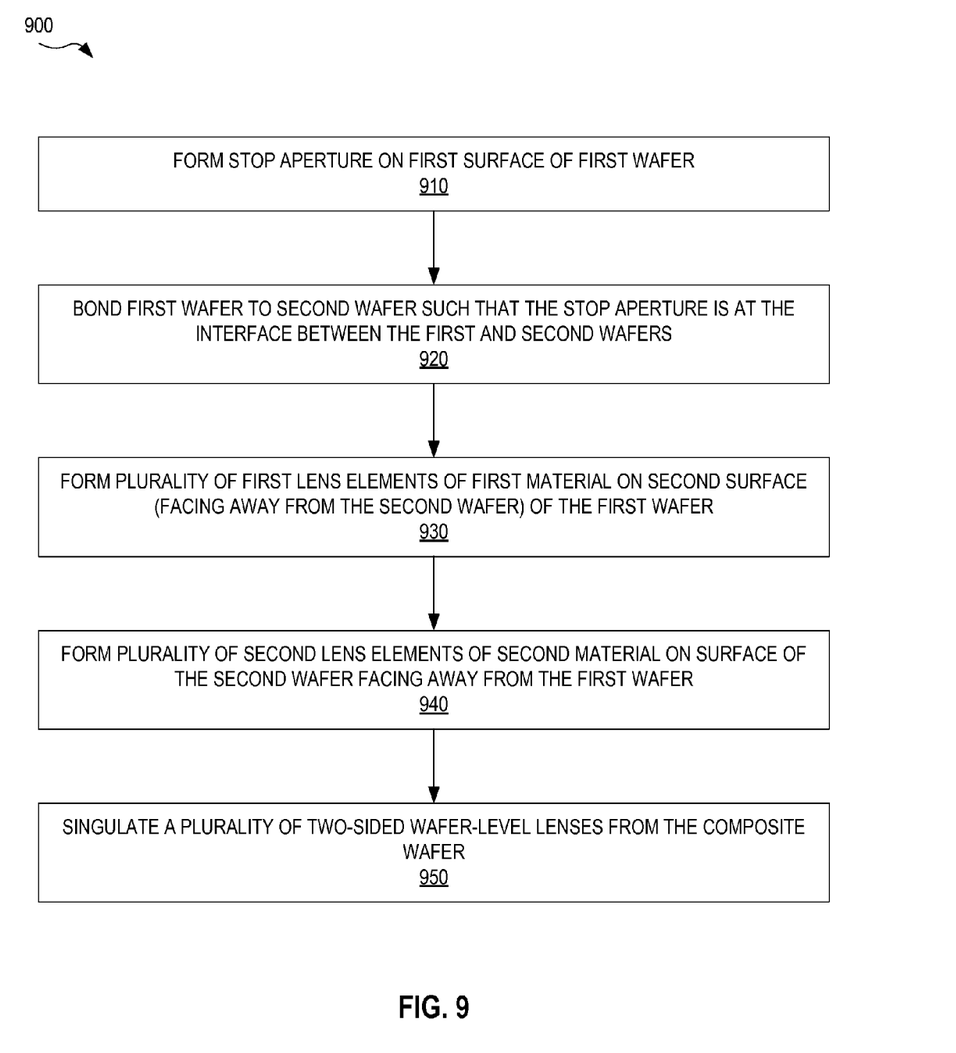
FIG. 9 illustrates another method for producing a plurality of two-sided wafer-level lenses having an internal aperture stop, according to an embodiment.

FIG. 9 illustrates another exemplary method 900 for forming two-sided wafer-level lenses each having an internal aperture stop, such as wafer-level lens 230 or 240 or an embodiment of wafer-level lens 130 having a aperture stop 138. Step 620 of method 600 may implement method 900. Method 900 is similar to method 800 but the order of operations in method 900 is rearranged, as compared to that of method 800, such that the two substrates are bonded together prior to forming the lens elements.

In a step 910, a plurality of aperture stops is formed on a first surface of a first wafer, for example by applying an opaque coating to portions of the first surface. In one example of step 910, a plurality of aperture stops 242 are coated onto a wafer made of the material associated with substrate 236.

In a step 920, the first wafer is bonded to a second wafer such that the aperture stops formed in step 910 are at the interface between the two wafers. In one example of step 920, a wafer made of the material associated with substrate 236, and having a plurality of aperture stops 242 coated onto a first surface thereof, is bonded to a wafer made of the material associated with substrate 238, such that aperture stops 242 are at the interface between the two wafers.

In a step 930, a plurality of lens elements 132 of a first material are formed on a second surface of the first wafer, wherein the second surface faces away from the second wafer. In one embodiment of step 930, the plurality of lens elements 132 are molded on the second surface of the wafer. For example, a resin (such as a polymer resin) is deposited onto the first second surface of the wafer; a mold with a plurality of recesses, each of shape complimentary to lens surface 133, is placed on the second surface (with the resin), the resin is cured, and the mold is removed from the second surface. The resin may be an ultraviolet (UV) curable epoxy that is cured by shining UV light through the wafer to the resin on the first surface. In one example of step 930, a plurality of lens elements 232 are formed on a composite wafer formed in step 920.

In a step 940, a plurality of lens elements 134 of a second material are formed on a second surface of the second wafer, wherein the second surface faces away from the first wafer. Step 940 may utilize the same method as step 930, however using a mold with a plurality of recesses, each of which have shape complimentary to lens surface 135. In one example of step 640, a plurality of lens elements 234 are formed on the composite wafer of step 920, on a surface facing away from the lens elements formed in step 930.

In a step 950, a plurality of wafer-level lenses 130 are singulated from the wafer formed in step 940. The wafer is diced, for example using methods known in the art, to form the plurality of wafer-level lenses 130 with aperture stops 138 internally within a two-substrate embodiment of substrate 136. In one example of step 950, the wafer produced in step 840 is singulated to form a plurality of wafer-level lenses 230.

Without departing from the scope hereof, the order of steps 930 and 940 may be reversed.

Combinations of Features

Features described above as well as those claimed below may be combined in various ways without departing from the scope hereof. For example, it will be appreciated that aspects of one wide-FOV lens systems described herein may incorporate or swap features of another wide-FOV lens systems described herein. The following examples illustrate some possible, non-limiting combinations of embodiments described above. It should be clear that many other changes and modifications may be made to the systems herein without departing from the spirit and scope of this invention:

(A1) A three-surface lens system for imaging a wide field-of-view scene onto an image plane may include a first lens surface facing the image plane, a second lens surface disposed between the first lens surface and the image plane, the second lens surface facing away from the image plane, and a third lens surface disposed between the second lens surface and the image plane, wherein the second lens surface faces away from the image plane and the third lens surface faces the image plane.

(A2) In the three-surface lens system denoted as (A1), the first lens surface, the second lens surface, and the third lens surface may be the only non-planar surfaces experienced by light propagating from the wide field-of-view scene to the image plane.

(A3) In either or both of the three-surface lens systems denoted as (A1) and (A2), the first lens surface may be concave.

(A4) In any of the three-surface lens systems denoted as (A1) through (A3), each of the second lens surface and the third lens surface may be convex.

(A5) In any of the three-surface lens systems denoted as (A1) through (A4), the first lens surface and the second lens surface may be separated from each other by an air gap.

(A6) In any of the three-surface lens systems denoted as (A1) through (A5), the second lens surface and the third lens surface may be separated from each other by a first solid portion.

(A7) The three-surface lens systems denoted as (A6) may include an aperture stop located between the second lens surface and the third lens surface.

(A8) In the three-surface lens system denoted as (A7), the first solid portion may include a second planar substrate and a third planar substrate having an interface with the second planar substrate, and the aperture stop may be located at the interface.

(A9) Any of the three-surface lens systems denoted as (A1) through (A8) may further include a planar surface closest to the wide field-of-view scene and a second solid portion extending between the planar surface and the first lens surface.

(A10) The three-surface lens system denoted as (A9) may have total track length TTL, from the planar surface to the image plane, and image circle diameter IC, wherein TTL/IC<1.45.

(A11) In any of the three-surface lens systems denoted as (A1) through (A10), the first lens surface may have radius of curvature R1, the second lens surface may have radius of curvature R2, the first lens surface and the second lens surface may be separated from each other by an air gap of length GAP at the optical axis of the three-surface lens system, wherein R1<0.45 millimeters, R2<1.0 millimeters, GAP>0.3 millimeters, and EFFL<0.95 millimeters, and wherein EFFL is the effective focal length of the three-surface lens system.

(A12) Any of the three-surface lens systems denoted as (A1) through (A11) may have field of view angle of at least 145 degrees.

(A13) In any of the three-surface lens systems denoted as (A1) through (A12), the first lens surface and the second lens surface may be separated from each other by an air gap of length GAP at the optical axis of the three-surface lens system, wherein 0.45 millimeters<GAP*(TTL/IC)<0.55, and wherein IC is the image circle diameter and TTL is the total track length of the three-surface lens system.

(B1) A three-surface wafer-level lens system for imaging a wide field-of-view scene onto an image plane may include (a) a first wafer-level lens with (i) a first substrate having a first planar surface facing the image plane and (ii) a first lens element bonded to the first planar surface and having a first lens surface facing the image plane, and (b) a second wafer-level lens with (i) a second substrate having a second planar surface facing away from the image plane, (ii) a third substrate bonded to the second substrate and having a third planar surface facing the image plane, (iii) a second lens element bonded to the second planar surface and having a second lens surface facing away from the image plane, and (iv) a third lens element bonded to the third planar surface and having a third lens surface facing the image plane.

(B2) In the three-surface wafer-level lens system denoted as (A1), the first lens surface may be concave, (B3) In either or both of the three-surface wafer-level lens systems denoted as (B1) and (B2), the second lens surface may be convex.

(B4) In any of the three-surface wafer-level lens systems denoted as (B1) through (B3), the third lens surface may be convex.

(B5) In any of the three-surface wafer-level lens systems denoted as (B1) through (B5), the first lens element may have Abbe number A1, the second lens element may have Abbe number A2<A1.

(B6) In the three-surface lens system denoted as (B5), the third lens element may have Abbe number A3>A2.

(B7) In any of the three-surface wafer-level lens systems denoted as (B1) through (B6), each of the first lens element, the second lens element, and the third lens element may be a molded lens element.

(B8) In any of the three-surface wafer-level lens systems denoted as (B1) through (B7), each of the first lens surface, second lens surface, and third lens surface may be aspheric.

(B9) Any of the three-surface wafer-level lens systems denoted as (B1) through (B8) may further include an aperture stop at interface between the second substrate and the third substrate.

(B10) Any of the three-surface wafer-level lens systems denoted as (B1) through (B9) may have total track length TTL and image circle diameter IC, wherein TTL/IC<1.45.

(B11) In the three-surface wafer-level lens system denoted as (B10), IC may be greater than the diameter of each of the first wafer-level lens and the second wafer-level lens.

(B12) In any of the three-surface wafer-level lens systems denoted as (B1) through (B11), the first lens surface may have radius of curvature R1, the second lens surface may have radius of curvature R2, the first lens surface and the second lens surface may be separated from each other by an air gap of length GAP at optical axis of the three-surface wafer-level lens system, wherein R1<0.45 millimeters, R2<1.0 millimeters, GAP>0.3 millimeters, and EFFL<0.95 millimeters, and wherein EFFL is the effective focal length of the three-surface wafer-level lens system.

(B13) Any of the three-surface wafer-level lens systems denoted as (B1) through (B12) may have field of view angle of at least 145 degrees.

(B14) In any of the three-surface wafer-level lens systems denoted as (B1) through (B13), the first lens surface and the second lens surface may be separated from each other by an air gap of length GAP at the optical axis of the three-surface wafer-level lens system, wherein 0.45 millimeters<GAP*(TTL/IC)<0.55, and wherein IC is the image circle diameter and TTL is the total track length of the three-surface wafer-level lens system.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present system and method, which, as a matter of language, might be said to fall therebetween.

What is claimed is:

1. A three-surface wafer-level lens system for imaging a wide field-of-view scene onto an image plane, comprising:
   a first wafer-level lens including
      a first substrate having a first planar surface facing the image plane, and
      a first lens element bonded to the first planar surface and having a first lens surface facing the image plane;
   a second wafer-level lens including
      a second substrate having a second planar surface facing away from the image plane,
      a third substrate bonded to the second substrate and having a third planar surface facing the image plane,
      a second lens element bonded to the second planar surface and having a second lens surface facing away from the image plane, and
   a third lens element bonded to the third planar surface and having a third lens surface facing the image plane;
   wherein total track length TTL and image circle diameter IC of the three-surface wafer-level lens system are characterized by TTL/IC<1.45.

2. The three-surface lens system of claim 1, the first lens surface being concave, each of the second lens surface and the third lens surface being convex.

3. The three-surface lens system of claim 1,
   the first lens surface and the second lens surface being separated from each other by an air gap; and
   the second lens surface and the third lens surface being separated from each other by a second solid portion.

4. The three-surface lens system of claim 3, comprising an aperture stop located between the second lens surface and the third lens surface.

5. The three-surface lens system of claim 4, the second solid portion including a second planar substrate and a third planar substrate having an interface with the second planar substrate, the aperture stop being located at the interface.

6. The three-surface wafer-level lens system of claim 1, IC being greater than diameter of each of the first wafer-level lens and the second wafer-level lens.

7. The three-surface wafer-level lens system of claim 1, having effective focal length EFFL, the first lens surface having radius of curvature R1, the second lens surface having radius of curvature R2, the first lens surface and the second lens surface being separated from each other by an air gap of length GAP at optical axis of the three-surface wafer-level lens system, wherein R1<0.45 millimeters, R2<1.0 millimeters, GAP>0.3 millimeters, and EFFL<0.95 millimeters.

8. The three-surface wafer-level lens system of claim 7, having field of view angle of at least 145 degrees.

9. The three-surface wafer-level lens system of claim 1, the first lens surface and the second lens surface being separated from each other by an air gap of length GAP at optical axis of the three-surface wafer-level lens system, wherein 0.45 millimeters<GAP*(TTL/IC)<0.55.

* * * * *